United States Patent US 12,509,079 B2
Nakatsuru et al. Date of Patent: Dec. 30, 2025

(54) VEHICLE CONTROL DEVICE, STORAGE MEDIUM STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventors: Yoshiki Nakatsuru, Tokyo-to (JP); Yoshihiro Aotani, Kawasaki (JP); Eiki Kitagawa, Tokyo-to (JP); Satoru Akahane, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 284 days.

(21) Appl. No.: 18/355,756

(22) Filed: Jul. 20, 2023

(65) Prior Publication Data
US 2024/0059288 A1 Feb. 22, 2024

(30) Foreign Application Priority Data
Aug. 16, 2022 (JP) .................. 2022-129617

(51) Int. Cl.
B60W 30/02 (2012.01)
B60W 30/16 (2020.01)
B60W 30/182 (2020.01)

(52) U.S. Cl.
CPC ........ *B60W 30/162* (2013.01); *B60W 30/182* (2013.01); *B60W 2552/00* (2020.02); *B60W 2554/80* (2020.02)

(58) Field of Classification Search
None
See application file for complete search history.

(56) References Cited

U.S. PATENT DOCUMENTS

| | | | |
|---|---|---|---|
| 10,293,819 B1* | 5/2019 | El-Khatib | B60W 60/00274 |
| 11,027,735 B2* | 6/2021 | Takeda | G05D 1/0257 |
| 11,491,987 B1* | 11/2022 | Ward | B60W 30/18163 |
| 11,597,388 B2* | 3/2023 | Wang | B60W 30/0953 |
| 2011/0010131 A1 | 1/2011 | Miyajima et al. | |
| 2013/0226433 A1 | 8/2013 | Tominaga et al. | |

(Continued)

FOREIGN PATENT DOCUMENTS

| | | |
|---|---|---|
| JP | 2003-139533 A | 5/2003 |
| JP | 2006-096319 A | 4/2006 |

(Continued)

*Primary Examiner* — Jonathan M Dager
(74) *Attorney, Agent, or Firm* — Dinsmore & Shohl LLP

(57) ABSTRACT

A vehicle control device has a processor configured to detect an other vehicle in a detection mode 1 in a visual field boundary zone, detect the other vehicle in a detection mode 2 with higher precision in a zone other than the visual field boundary zone, and, when a merging terrain exists and the other vehicle has been detected in the visual field boundary zone, generate a plan to control the speed of the own vehicle in a first deceleration mode 1 until the other vehicle is detected in a zone other than the visual field boundary zone, or when the merging terrain exists and the other vehicle has been detected in a zone other than the visual field boundary zone, generate a plan to carry out space creation processing, whereby a space allowing the other vehicle to move from the adjacent lane is created.

5 Claims, 5 Drawing Sheets

(56) References Cited

U.S. PATENT DOCUMENTS

| | | | |
|---|---|---|---|
| 2014/0129073 A1* | 5/2014 | Ferguson | B60W 30/18163 701/23 |
| 2014/0195093 A1* | 7/2014 | Litkouhi | B60W 30/18163 701/23 |
| 2016/0161270 A1* | 6/2016 | Okumura | G08G 1/165 701/23 |
| 2017/0203764 A1* | 7/2017 | Fujiki | B60W 10/20 |
| 2018/0033308 A1* | 2/2018 | Litkouhi | G08G 1/166 |
| 2018/0354518 A1* | 12/2018 | Inou | B60W 60/00272 |
| 2019/0329778 A1* | 10/2019 | D'sa | G06V 20/56 |
| 2019/0367022 A1* | 12/2019 | Zhao | B60W 30/0956 |
| 2020/0262444 A1* | 8/2020 | Kong | B60W 50/085 |
| 2020/0307589 A1* | 10/2020 | Li | B60W 60/0023 |
| 2020/0307595 A1* | 10/2020 | Kato | B60W 10/30 |
| 2020/0307600 A1 | 10/2020 | Sato | |
| 2021/0043088 A1* | 2/2021 | Yu | B60W 30/18163 |
| 2022/0289201 A1* | 9/2022 | Nordbruch | B60W 40/04 |
| 2022/0371595 A1* | 11/2022 | Meuresch | G08G 1/167 |
| 2023/0282108 A1* | 9/2023 | Komiyama | G08G 1/0145 701/119 |
| 2024/0051536 A1* | 2/2024 | Aotani | B60W 30/18163 |
| 2024/0083454 A1* | 3/2024 | Takeuchi | B60W 30/146 |
| 2024/0092365 A1* | 3/2024 | Goto | B60W 40/04 |
| 2024/0270280 A1* | 8/2024 | Kume | B60W 60/001 |
| 2024/0326809 A1* | 10/2024 | Kaneko | B60W 30/16 |
| 2025/0026353 A1* | 1/2025 | Hashimoto | B60W 30/18163 |

FOREIGN PATENT DOCUMENTS

| | | |
|---|---|---|
| JP | 2008-310585 A | 12/2008 |
| JP | 2011-017989 A | 1/2011 |
| JP | 2013-177054 A | 9/2013 |
| JP | 2015153153 A | 8/2015 |
| JP | 2019-070986 A | 5/2019 |
| JP | 2020160885 A | 10/2020 |
| JP | 2021-064146 A | 4/2021 |

* cited by examiner

VEHICLE CONTROL DEVICE, STORAGE MEDIUM STORING COMPUTER PROGRAM FOR VEHICLE CONTROL, AND METHOD FOR CONTROLLING VEHICLE

CROSS-REFERENCE TO RELATED APPLICATION

This application claims priority to Japanese Patent Application No. 2022-129617 filed on Aug. 16, 2022, the entire contents of which are herein incorporated by reference.

FIELD

The present disclosure relates to a vehicle control device, a storage medium storing a computer program for vehicle control, and a method for controlling a vehicle.

BACKGROUND

An automatic control system mounted in a vehicle creates a navigation route for the vehicle based on the current location of the vehicle, the destination location of the vehicle, and a navigation map. The automatic control system estimates the current location of the vehicle using the map information and controls the vehicle to travel along the navigation route.

In a merging terrain where an adjacent lane that is adjacent to the traveling lane in which an own vehicle is traveling vanishes by merging, other vehicles traveling in the adjacent lane move toward the traveling lane. When another vehicle traveling in the adjacent lane has been detected ahead of the own vehicle, the automatic control system of the own vehicle creates a space allowing the other vehicle to move ahead of the own vehicle (yield control) in a range in which a driving plan can be created, controlling the own vehicle so that the other vehicle can move into the traveling lane (see Japanese Unexamined Patent Publication No. 2015-153153, for example).

SUMMARY

When another vehicle is present in merging terrain near the boundary of the visual field of a sensor such as a camera or LiDAR mounted on the own vehicle, it has sometimes been impossible for the automatic control system to accurately detect the other vehicle.

If the other vehicle cannot be accurately detected, the automatic control system is unable to ascertain the positional relationship between the other vehicle and the own vehicle. Therefore, when space creation processing has begun after another vehicle has been detected at the border of the visual field, the space creation processing is carried out in an unstable control state.

It is an object of the present disclosure to provide a vehicle control device that can plan stable space creation processing in merging terrain even when another vehicle has been detected in a boundary zone that includes the boundary of the predetermined visual field.

(1) One embodiment of the present disclosure provides a vehicle control device. The vehicle control device has a detecting unit that detects an other vehicle based on surrounding environment information representing an environment surrounding an own vehicle within a predetermined visual field, wherein the other vehicle is detected in a first detection mode in a boundary zone that includes a boundary of the visual field, and the other vehicle is detected in a second detection mode that detects the other vehicle with higher precision than the first detection mode in a zone other than the visual field boundary zone; a determining unit that determines whether or not a merging terrain exists where an adjacent lane which is adjacent to a traveling lane in which the own vehicle is traveling vanishes by merging with the traveling lane within a predetermined range from a current location of the own vehicle ahead on a course of the own vehicle; and a planning unit that generates a plan to control the speed of the own vehicle for space creation processing whereby a space is created on the traveling lane ahead of the own vehicle to allow movement of the other vehicle into the adjacent lane, in which when it has been determined by the determining unit that the merging terrain exists and the other vehicle traveling in the adjacent lane has been detected by the detecting unit in the visual field boundary zone, the planning unit generates a plan to control the speed of the own vehicle in a first deceleration mode until the other vehicle traveling in the adjacent lane is detected by the detecting unit in a zone other than the visual field boundary zone, or when it has been determined by the determining unit that the merging terrain exists and the other vehicle traveling in the adjacent lane has been detected by the detecting unit in a zone other than the visual field boundary zone, the planning unit generates a plan to carry out the space creation processing by controlling the speed of the own vehicle at a second deceleration mode which allows deceleration at a greater change of speed than the first deceleration mode.

(2) In the vehicle control device of (1), in some embodiments, when another vehicle has been detected by the detecting unit in a zone other than the visual field boundary zone after the speed of the own vehicle has been controlled in the first deceleration mode, the planning unit generates a plan to carry out the space creation processing by controlling the speed of the own vehicle at the second deceleration mode.

(3) In the vehicle control device of (1) or (2), in some embodiments, the planning unit generates a plan to decelerate the own vehicle without braking in the first deceleration mode, and to decelerate the own vehicle with braking in the second deceleration mode.

(4) According to another embodiment, a computer-readable, non-transitory storage medium is provided which stores a computer program for vehicle control. The computer program for vehicle control execute a process and the process includes detecting an other vehicle based on surrounding environment information representing an environment surrounding an own vehicle within a predetermined visual field, wherein the other vehicle is detected in a first detection mode in a boundary zone that includes a boundary of the visual field, and the other vehicle is detected in a second detection mode that detects the other vehicle with higher precision than the first detection mode in a zone other than the visual field boundary zone; determining whether or not a merging terrain exists where an adjacent lane which is adjacent to a traveling lane in which the own vehicle is traveling vanishes by merging with the traveling lane within a predetermined range from a current location of the own vehicle ahead on a course of the own vehicle; and generating a plan to control the speed of the own vehicle for space creation processing whereby a space is created on the traveling lane ahead of the own vehicle to allow movement of the other vehicle into the adjacent lane, in which when it has been determined that the merging terrain exists and the other vehicle traveling in the adjacent lane has been detected in the visual field boundary zone, it is planned to control the speed of the own vehicle in a first deceleration mode until the other vehicle traveling in the adjacent lane is detected in a zone other than the visual field boundary zone, or when it has been determined that the merging terrain exists and the other vehicle traveling in the adjacent lane has been detected in a zone other than the visual field boundary zone, it is planned to carry out space creation processing by controlling the speed of the own vehicle at a second deceleration mode which allows deceleration of the own vehicle at a greater change of speed than the first deceleration mode.

(5) Another embodiment of the present disclosure provides a method for controlling a vehicle. The method for controlling a vehicle is carried out by a vehicle control device and includes detecting an other vehicle based on surrounding environment information representing an environment surrounding an own vehicle within a predetermined visual field, wherein the other vehicle is detected in a first detection mode in a boundary zone that includes a boundary of the visual field, and the other vehicle is detected in a second detection mode that detects the other vehicle with higher precision than the first detection mode in a zone other than the visual field boundary zone; determining whether or not a merging terrain exists where an adjacent lane which is adjacent to a traveling lane in which the own vehicle is traveling vanishes by merging with the traveling lane within a predetermined range from a current location of the own vehicle ahead on a course of the own vehicle; and generating a plan to control the speed of the own vehicle for space creation processing whereby a space is created on the traveling lane ahead of the own vehicle to allow movement of the other vehicle into the adjacent lane, in which when it has been determined that the merging terrain exists and the other vehicle traveling in the adjacent lane has been detected in the visual field boundary zone, it is planned to control the speed of the own vehicle in a first deceleration mode until the other vehicle traveling in the adjacent lane is detected in a zone other than the visual field boundary zone, or when it has been determined that the merging terrain exists and the other vehicle traveling in the adjacent lane has been detected in a zone other than the visual field boundary zone, it is planned to carry out space creation processing by controlling the speed of the own vehicle at a second deceleration mode which allows deceleration of the own vehicle at a greater change of speed than the first deceleration mode.

The vehicle control device of the present disclosure can plan space creation processing in a stable manner after accurately detecting another vehicle, both in cases where another vehicle has been detected in a boundary zone that includes the boundary of a predetermined visual field, and in cases where another vehicle has been detected in a zone other than the visual field boundary zone.

The object and advantages of the present disclosure will be realized and attained by means of the elements and combinations particularly indicated in the claims. It is to be understood that both the foregoing general description and the following detailed description are exemplary and explanatory, and are not restrictive of the present disclosure as claimed.

DESCRIPTION OF EMBODIMENTS

Figure 1:
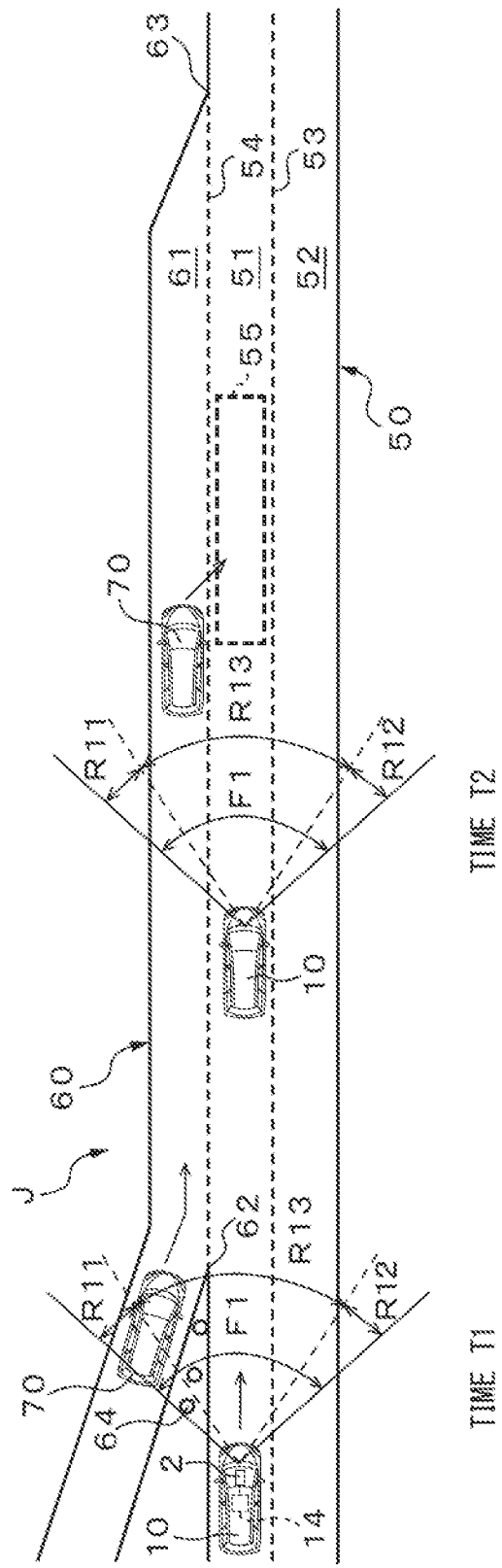
FIG. 1 is a diagram showing operation of the drive planning device of the embodiment in overview.

FIG. 1 is a diagram showing operation of the drive planning device 14 of the embodiment in overview. Operation for vehicle control processing by the drive planning device 14 as disclosed herein will now be described in overview with reference to FIG. 1. The drive planning device 14 is an example of the vehicle control device.

As shown in FIG. 1, a vehicle 10 travels on one lane 51 of a road 50 having lanes 51, 52. The vehicle 10 is an example of "an own vehicle". The lane 51 and lane 52 are divided by a lane marking line (lane boundary) 53. The vehicle 10 is traveling straight on the traffic lane 51 of the road 50.

A merging terrain J exists where a road 60 merges with the road 50 ahead of the current location of the vehicle 10. The traffic lane 61 of the road 60 and the lane 51 of the road 50 are connected between a merge start location 62 and a merge end location 63, at the merging terrain J. The lane 61 and lane 51 are divided by a lane marking line (lane boundary) 54. The lane 61 of the road 60 is adjacent to the lane 51 of the road 50 on which the vehicle 10 is traveling.

In the merging terrain J, the lane 61 of the road 60 vanishes as it merges with the lane 51. In the merging terrain J, another vehicle 70 traveling in the lane 61 of the road 60 moves from the lane 61 to the lane 51. The other vehicle 70 is an example of "another vehicle".

The vehicle 10 has a drive planning device 14. The drive planning device 14 detects the vehicle 70 in the area ahead of the vehicle 10, based on information acquired by a sensor such as a camera 2. Referring to the location of the vehicle 70, the drive planning device 14 also generates a driving plan representing a scheduled traveling trajectory for the vehicle 10 until a predetermined time ahead.

In the example shown in FIG. 1, the drive planning device 14 determines that the merging terrain J exists within the nearest driving zone, based on the current location of the vehicle 10 and map information.

When a vehicle 70 has been detected traveling in the lane 61 of the road 60 in merging terrain J, the drive planning device 14 generates a plan to carry out space creation processing whereby the speed of the vehicle 10 is controlled to create a space 55 in the lane 51 ahead of the vehicle 10 allowing the vehicle 70 to move from the lane 61.

When the vehicle 70 is present in merging terrain J near the boundary of the visual field F1 of a sensor such as a camera 2 mounted on the vehicle 10, it has sometimes been impossible for the drive planning device 14 to accurately detect the vehicle 70. It has been particularly difficult to accurately detect the vehicle 70 when the vehicle 70 is overlapping with a rubber pole 64 or the like.

In the example shown in FIG. 1, the camera 2 has a visual field F1 directed in front of the vehicle 10. A predetermined region inside the visual field F1 from the boundary on the left side of the visual field F1 is the boundary zone R11, and a predetermined region inside the visual field F1 from the boundary on the right side of the visual field F1 is the boundary zone R12. The region R13 outside of the boundary zone is a region including the center of the visual field F1.

When the vehicle 70 cannot be accurately detected, the drive planning device 14 cannot ascertain the positional relationship between the vehicle 70 and the vehicle 10, and consequently when the vehicle 70 moves from the lane 61 to the lane 51, the state of control can potentially be unstable while creating the space 55 to allow the vehicle 70 to move ahead of the vehicle 10.

The drive planning device 14 detects the vehicle 70 in a first detection mode in the boundary zones R11, R12 that include the boundary of the visual field F1 of the sensor such as a camera 2, while in the region R13 outside of the boundary zone of the visual field F1, it detects the vehicle 70 in a second detection mode that detects the vehicle 70 with higher precision than the first detection mode.

At time T1, when it has been determined that a merging terrain J exists and the vehicle 70 traveling in the lane 61 has been detected in the boundary zone R11 of the visual field F1, the drive planning device 14 generates a plan to control the speed of the vehicle 10 in a first deceleration mode, until the vehicle 70 traveling in the lane 61 is detected in the region R13 outside of the boundary zone of the visual field F1. This processing is preprocessing for space creation processing.

As a result of deceleration of the vehicle 10 in the first deceleration mode, the vehicle 70 moves relatively ahead of the vehicle 10 and is detected in the region R13 outside of the boundary zone of the visual field F1.

At time T2, the vehicle 70 traveling in the lane 61 has been detected in the region R13 outside of the boundary zone of the visual field F1, and therefore the drive planning device 14 generates a plan to carry out space creation processing by controlling the speed of the vehicle 10 in a second deceleration mode allowing the vehicle 10 to decelerate at a greater change of speed than the first deceleration mode.

At time T1, when it has been determined that a merging terrain J exists and the vehicle 70 traveling in the lane 61 has been detected in the region R13 outside of the boundary zone of the visual field F1, the drive planning device 14 generates a plan from the start to carry out space creation processing by controlling the speed of the vehicle 10 in a second deceleration mode.

As explained above, the drive planning device 14 can generate a plan for stable space creation processing after accurate detection of the vehicle 70, in both cases where the vehicle 70 traveling in the lane 61 has been detected in the boundary zone R11 of the visual field F1 and where the vehicle 70 traveling in the lane 61 has been detected in the region R13 outside of the boundary zone of the visual field F1.

Figure 2:
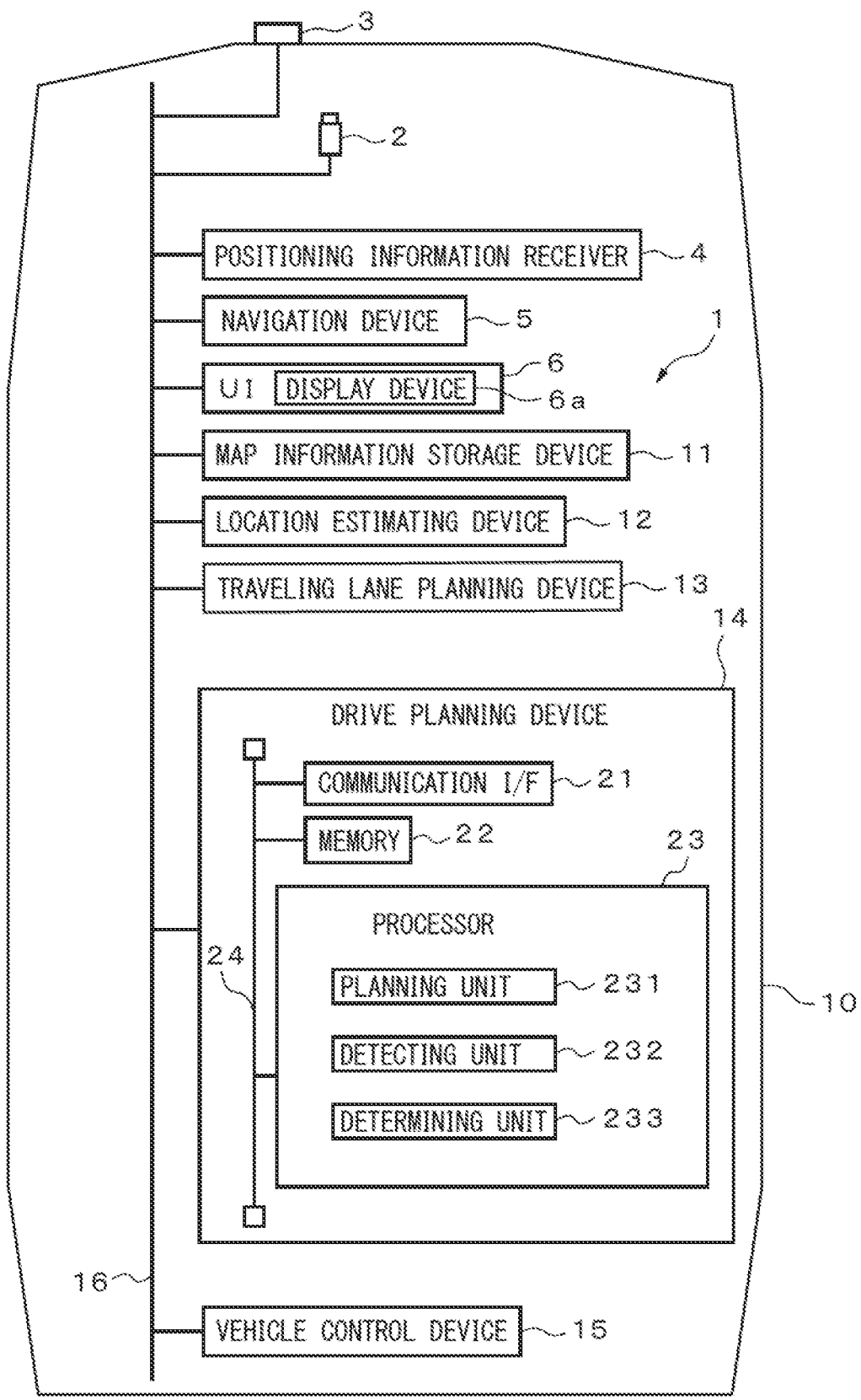
FIG. 2 is a general schematic drawing of a vehicle in which a vehicle control system of the embodiment is mounted.

FIG. 2 is a general schematic drawing of a vehicle 10 in which a vehicle control system 1 of the embodiment is mounted. The vehicle 10 has a camera 2, a LiDAR sensor 3, a positioning information receiver 4, a navigation device 5, a user interface (UI) 6, a map information storage device 11, a location estimating device 12, a traveling lane planning device 13, a drive planning device 14 and a vehicle control device 15. The vehicle 10 may also have a millimeter wave radar, as a distance sensor (not shown) for measurement of the distance of the vehicle 10 to surrounding objects. The vehicle control system 1 has a camera 2, a LiDAR sensor 3 and a drive planning device 14.

The camera 2, LiDAR sensor 3, positioning information receiver 4, navigation device 5, UI 6, map information storage device 11, location estimating device 12, traveling lane planning device 13, drive planning device 14 and vehicle control device 15 are connected in a communicable manner through an in-vehicle network 16 that conforms to controller area network standards.

The camera 2 is an example of an imaging unit provided in the vehicle 10. The camera 2 is mounted inside the vehicle 10 and directed toward the front of the vehicle 10. The camera 2 takes a camera image in which the environment of a region in a predetermined visual field ahead of the vehicle 10 is shown, at a camera image photograph time set with a predetermined cycle, for example. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that generates an image of the photographed region on the 2D detector. The camera image is an example of surrounding environment information.

Each time a camera image is taken, the camera 2 outputs the camera image and the camera image photograph time through the in-vehicle network 16 to the location estimating device 12 and the drive planning device 14, etc. The camera image is also used for processing at the location estimating device 12 to estimate the location of the vehicle 10. At the drive planning device 14, the camera image is used for processing to detect other objects surrounding the vehicle 10.

The LiDAR sensor 3 is mounted on the outer side of the vehicle 10, for example, being directed toward the front of the vehicle 10. The LiDAR sensor 3 emits a scanning laser toward the predetermined visual field in front of the vehicle 10, at a reflected wave information acquisition time set with a predetermined cycle, and receives a reflected wave that has been reflected from a reflector. The time required for the reflected wave to return contains information for the distance between the vehicle 10 and other objects located in the direction in which the laser has been emitted. The LiDAR sensor 3 outputs the reflected wave information that includes the laser emission direction and the time required for the reflected wave to return, together with the reflected wave information acquisition time at which the laser was emitted, through the in-vehicle network 16 to the drive planning device 14, etc., for example. At the drive planning device 14, the reflected wave information is used for processing to detect other objects surrounding the vehicle 10. The reflected wave information is an example of surrounding environment information.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, etc., each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. The navigation route includes information relating to the locations of right turns, left turns, merging and branching. When the destination location has been newly set or the current location of the vehicle 10 has exited the navigation route, the navigation device 5 creates a new navigation route for the vehicle 10. Every time a navigation route is created, the navigation device 5 outputs the navigation route to the location estimating device 12, the traveling lane planning device 13 and the drive planning device 14, etc., via the in-vehicle network 16. The navigation device 5 does not create a navigation route when no destination location has been set.

The UI 6 is an example of the notification unit. The UI 6, controlled by the navigation device 5, drive planning device 14 and vehicle control device 15, notifies the driver of the vehicle 10 traveling information. The traveling information of the vehicle 10 includes information relating to the current location of the vehicle 10 and the current and future route of the vehicle, such as the navigation route. The UI 6 has a display device 6a such as a liquid crystal display or touch panel, for display of the traveling information. The UI 6 may also have an acoustic output device (not shown) to notify the driver of traveling information. The UI 6 also generates an operation signal in response to operation of the vehicle 10 by the driver. The operation information may be, for example, a destination location, transit points, vehicle speed or other control information. The UI 6 also has a touch panel or operating button, for example, as an input device for inputting operation information from the driver to the vehicle 10. The UI 6 outputs the input operation information to the navigation device 5 and the drive planning device 14, etc., via the in-vehicle network 16.

The map information storage device 11 stores wide-area map information for a relatively wide area (an area of 10 km$^2$ to 30 km$^2$, for example) that includes the current location of the vehicle 10. In some embodiments, the map information has high-precision map information including three-dimensional information for the road surface, the speed limit for the road, the curvature of the road, and information for the types and locations of structures and road features such as road lane marking lines.

The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 m$^2$ to 10 km$^2$), through the in-vehicle network 16 to the location estimating device 12, traveling lane planning device 13, drive planning device 14 and vehicle control device 15, etc.

The location estimating device 12 estimates the location of the vehicle 10 at the camera image photograph time, based on the road features surrounding the vehicle 10 represented in the camera image taken by the camera 2. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the detecting unit 232, traveling lane planning device 13, drive planning device 14 and vehicle control device 15, etc.

At a traveling lane-planning creation time set in a predetermined cycle, the traveling lane planning device 13 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 13 creates a traveling lane plan for the vehicle 10 to travel on a traffic lane other than a passing traffic lane. Each time a traveling lane plan is created, the traveling lane planning device 13 outputs the traveling lane plan to the drive planning device 14, etc.

The drive planning device 14 carries out plan processing, detection processing and determination processing. The drive planning device 14 has a communication interface (IF) 21, a memory 22 and a processor 23 for this purpose. The communication interface 21, memory 22 and processor 23 are connected via signal wires 24. The communication interface 21 has an interface circuit to connect the drive planning device 14 with the in-vehicle network 16.

The memory 22 is an example of a memory unit, and it has a volatile semiconductor memory and a non-volatile semiconductor memory, for example. The memory 22 stores an application computer program and various data to be used for information processing carried out by the processor 23 of each device.

All or some of the functions of the drive planning device 14 are functional modules driven by a computer program operating on the processor 23, for example. The processor 23 has a planning unit 231, a detecting unit 232 and a determining unit 233. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit.

At a driving plan creation time set with a predetermined cycle, the planning unit 231 carries out driving plan processing in which it generates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. In some embodiments, the driving plan is created so as to satisfy predetermined restrictions. The predetermined restrictions may be acceleration, deceleration and yaw rate, etc., for example. The surrounding environment information includes the locations and speeds of other vehicles traveling around the vehicle 10, etc. The vehicle status information includes the current location of the vehicle 10, and the vehicle speed, acceleration and traveling direction. The driving plan is represented as a combination of the target location of the vehicle 10 and the target vehicle speed at the target location, at each time from the current time until the predetermined time. In some embodiments, the cycle in which the driving plan is created is shorter than the cycle in which the traveling lane plan is created. The drive planning device 14 generates a driving plan to maintain a spacing of at least a predetermined distance between the vehicle 10 and other objects (such as vehicles). The drive planning device 14 outputs the driving plan to the vehicle control device 15 for each driving plan generated.

The planning unit 231 generates a plan for space creation processing. For example, if the distance between the merge end location and the current location of the vehicle 10 in the merging terrain is at least a predetermined reference distance, the relative speed of the vehicle 10 and the other vehicle is within a predetermined reference speed, and the relative distance between the vehicle 10 and the other vehicle is within a predetermined reference distance, then the planning unit 231 determines to begin space creation processing. The other vehicle is a vehicle that travels on the adjacent lane that vanishes by merging with the lane in which the vehicle 10 is traveling. Space creation processing is not planned even when it has been decided to begin space creation processing, if it is necessary to create a driving plan that does not satisfy predetermined restrictions such as deceleration of at least a predetermined reference deceleration. When space creation processing has been planned, the planning unit 231 also creates a driving plan that includes space creation processing.

The detecting unit 232 detects other objects around the vehicle 10, and their types, based on the camera image. Other objects also include other vehicles traveling around the vehicle 10. The detecting unit 232 detects objects represented in the camera image, by inputting the image into an classifier, for example. The detecting unit 232 compares the reliability of a detected object output from the classifier against a predetermined reference reliability, and determines that an object has been detected when the reliability of the object is above the reference reliability.

The classifier may use a deep neural network (DNN) that has been trained to detect objects represented in input images, for example. The detecting unit 232 used may also be an classifier other than a DNN. For example, the classifier used by the detecting unit 232 may be a support vector machine (SVM) that has been trained to output a confidence factor for representation of objects to be detected in the window, with the input being a feature descriptor (such as Histogram of Oriented Gradients, HOG, for example) calculated from a window set in the camera image. Alternatively, the detecting unit 232 may detect an object region by template matching between the image and a template in which an object to be detected is represented.

The detecting unit 232 may also detect other objects around the vehicle 10 based on reflected wave information output by the LiDAR sensor 3. The detecting unit 232 may also determine the orientation of another object with respect to the vehicle 10 based on the location of the other object in the camera image, and may determine the distance between the other object and the vehicle 10, based on the orientation and on the reflected wave information output by the LiDAR sensor 3. The detecting unit 232 estimates the location of the other object represented in a world coordinate system based on the current location of the vehicle 10, and the distance of the other object from the vehicle 10 and its orientation, for example. The detecting unit 232 may also track another object to be detected from an updated image, by matching other objects detected in the updated camera image with objects detected in previous images, according to a tracking process based on optical flow. The detecting unit 232 may also calculate the trajectory of another object being tracked, based on the location of the object in an image updated from a previous image, represented in the world coordinate system. The detecting unit 232 can estimate the speed of another object with respect to the vehicle 10, based on changes in the location of the object over the course of time. The detecting unit 232 can also estimate the acceleration of another object based on changes in the location of the object over the course of time. In addition, the detecting unit 232 identifies the traveling lane in which the other object is traveling, based on the lane marking lines represented in the map information and the location of the object. The detecting unit 232 also determines, for example, whether another object is traveling in a traffic lane defined by two mutually adjacent lane marking lines situated on either side of the center location of the other object in the lateral direction.

The detecting unit 232 may also detect an object represented in reflected wave information (a distance image) output by the LiDAR sensor 3 by inputting the reflected wave information (distance image) to the classifier. The classifier may use a deep neural network (DNN) that has been trained to detect objects represented in input reflected wave information (distance images), from the reflected wave information (distance images), for example. The detecting unit 232 compares the reliability of a detected object output from the classifier against a predetermined reference reliability, and determines that an object has been detected when the reliability of the object is above the reference reliability. The detecting unit 232 may also detect other objects around the vehicle 10, and their types, based on the camera image and reflected wave information. The detecting unit 232 may also detect other objects around the vehicle 10, and their types, based only on the camera image. The detecting unit 232 may also detect other objects around the vehicle 10, and their types, based only on the reflected wave information.

The detecting unit 232 notifies the planning unit 231 and determining unit 233, etc. of object detection information which includes information indicating the type of other object that was detected, information indicating its location, and information indicating its speed, acceleration and traveling lane. Other operation by the drive planning device 14 will be described in detail below.

The vehicle control device 15 controls each unit of the vehicle 10 based on the current location of the vehicle 10 and the vehicle speed and yaw rate, as well as on the driving plan generated by the drive planning device 14. For example, the vehicle control device 15 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 15 also outputs a control signal corresponding to a set steering amount, to an actuator (not shown) that controls the steering wheel for the vehicle 10, via the in-vehicle network 16. The vehicle control device 15 also outputs a control signal corresponding to the set accelerator level, to a drive unit (engine or motor) of the vehicle 10, via the in-vehicle network 16. Alternatively, the vehicle control device 15 may output a control signal corresponding to a set brake level to the brake (not shown) of the vehicle 10, via the in-vehicle network 16.

The map information storage device 11, location estimating device 12, traveling lane planning device 13, drive planning device 14 and vehicle control device 15 are electronic control units (ECU), for example. For FIG. 2, the map information storage device 11, location estimating device 12, traveling lane planning device 13, drive planning device 14 and vehicle control device 15 were explained as separate devices, but all or some of them may be constructed in a single device.

Moreover, the detecting unit 232 in FIG. 2 was explained as part of the drive planning device 14, but the detecting unit 232 may instead be constructed separately from the drive planning device 14. In this case, the vehicle control device will be composed of the detecting unit 232 and the drive planning device 14.

Figure 3:
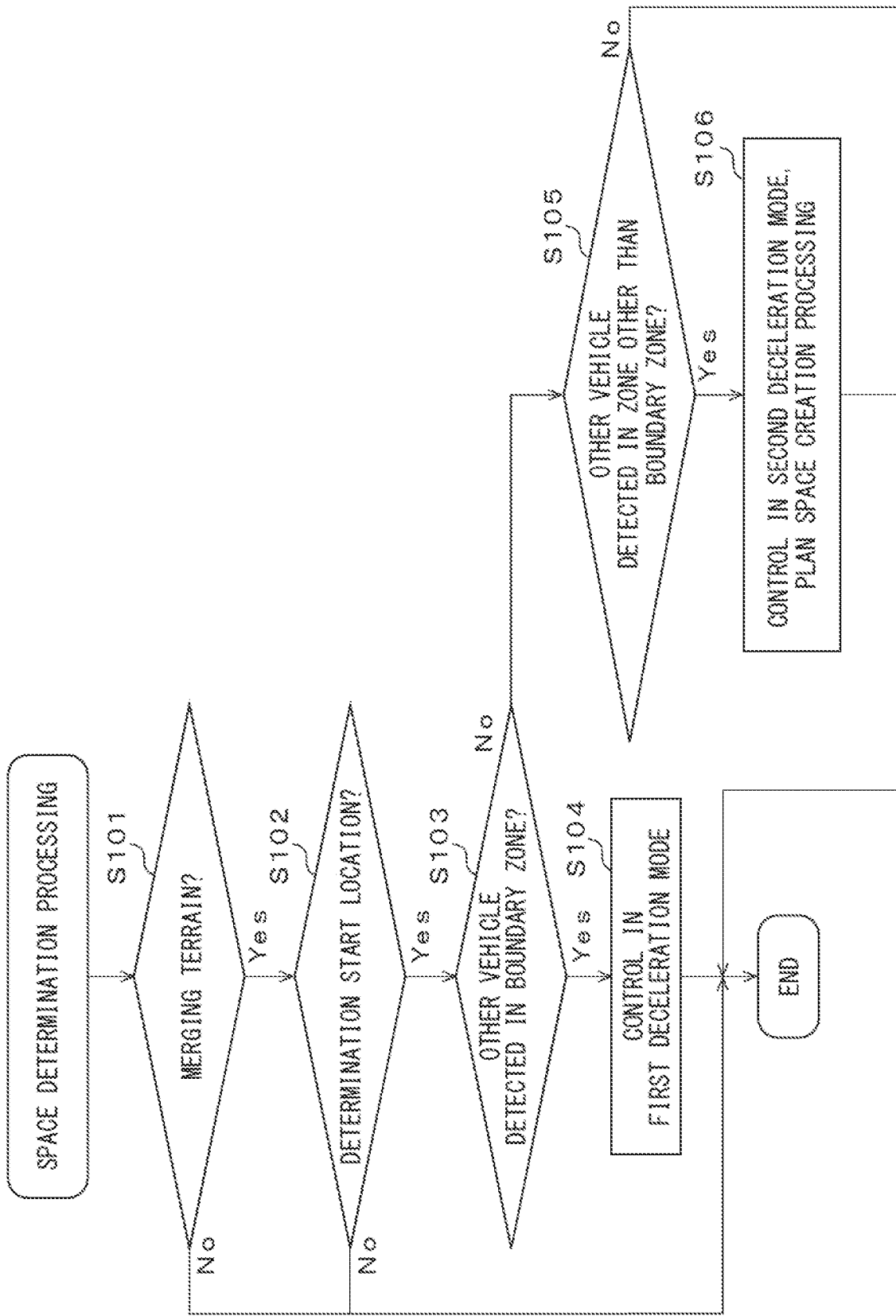
FIG. 3 is an example of an operation flow chart for space determination processing by the drive planning device of the embodiment.

FIG. 3 is an example of an operation flow chart for space determination processing by the drive planning device 14 of the embodiment. Space determination processing by the drive planning device 14 will be described with reference to FIG. 3. The drive planning device 14 carries out space determination processing according to the operation flow chart shown in FIG. 3, at a space determination time having a predetermined cycle.

First, the determining unit 233 determines whether or not a merging terrain exists where an adjacent lane that is adjacent to the traveling lane in which the vehicle 10 is traveling vanishes by merging with the traveling lane, within a predetermined range ahead on the course of the vehicle 10 from the current location of the vehicle 10 (step S101). Specifically, the determining unit 233 determines whether or not a merging terrain exists within the nearest driving zone of the navigation route, based on the current location of the vehicle 10, the navigation route and the map information. Merging terrain includes both cases where another road merges with the road on which the vehicle 10 is traveling, and the adjacent lane that is adjacent to the traveling lane vanishes by merging with the traveling lane (see FIG. 1), and cases where an adjacent lane that is adjacent to the traveling lane vanishes by merging with the traveling lane on the road on which the vehicle 10 is traveling (for example, an upwardly inclined lane). It is determined that a merging terrain exists up until the vehicle 10 passes through a merge end location where connection between the traveling lane and the adjacent lane ends.

When a merging terrain exists (step S101—Yes), the determining unit 233 determines whether or not the vehicle 10 has reached a determination start location where space determination processing is to start (step S102). The determining unit 233 sets the determination start location to be a location at a predetermined distance before the merge start location where connection between the traveling lane and adjacent lane begins. In some embodiments, the determination start location is set at a location where the merging terrain is visible to the driver.

The predetermined distance may be determined based on the speed of the vehicle 10, for example. The speed of the vehicle 10 may be the legal speed limit for the road, the speed limit, or the most recent average speed of the vehicle 10. Sight distance, for example, may be used as the predetermined distance that is decided based on the speed of the vehicle 10. Sight distance is established for each legal speed limit, being the visible distance for drivers, and road structures are built during road construction so as not to impede the visual field of drivers. When the vehicle 10 has not reached the determination start location (step S102—No), the series of processing steps is complete. The determination start location may also be a soft nose location, for example. Soft nose locations can be ascertained based on map information. When a merging terrain does not exist (step S101—No), the series of processing steps is likewise complete.

When the vehicle 10 has reached the determination start location (step S102—Yes), the determining unit 233 determines whether or not another vehicle traveling in the adjacent lane has been detected by the detecting unit 232 in the visual field boundary zones of the sensors 2, 3 (step S103). The adjacent lane is the lane that vanishes by merging with the traveling lane in merging terrain. This also applies throughout the following explanation. Detection of another vehicle traveling in the adjacent lane in the visual field boundary zones of the sensors 2, 3 by the detecting unit 232 will now be described.

When another vehicle has been detected by the detecting unit 232 in a visual field boundary zone (step S103—Yes), the planning unit 231 generates a plan to control the speed of the vehicle 10 in the first deceleration mode until another vehicle traveling in the adjacent lane is detected by the detecting unit 233 in a region other than the visual field boundary zones of the sensors 2, 3 (step S104), and the series of processing steps is complete. This processing is preprocessing for space creation processing.

In the first deceleration mode, the vehicle 10 is decelerated so that the other vehicle traveling in the adjacent lane can move relatively ahead of the vehicle 10, allowing the other vehicle to be detected in a region other than the visual field boundary zones of the sensors 2, 3. In some embodiments, the deceleration in the first deceleration mode is a deceleration of a degree that makes it difficult for the driver to recognize that the vehicle 10 is decelerating without viewing the speedometer. In the first deceleration mode, deceleration of the vehicle 10 may be accomplished by ceasing acceleration by the drive unit (engine or motor) and allowing the engine brake or frictional force to act without braking with the brakes. This will help to prevent the driver from feeling that the vehicle 10 is decelerating.

When no other vehicle traveling in an adjacent lane has been detected by the detecting unit 232 in the visual field boundary zones of the sensors 2, 3 (step S103—No), on the other hand, the determining unit 233 determines whether or not another vehicle traveling in the adjacent lane is detected by the detecting unit 232 in a region other than the visual field boundary zones of the sensors 2, 3 (step S105). Detection of another vehicle traveling in the adjacent lane in a region other than the visual field boundary zones of the sensors 2, 3 by the detecting unit 232 will now be described.

When another vehicle traveling in the adjacent lane has been detected by the detecting unit 232 in a region other than the visual field boundary zones of the sensors 2, 3 (step S105—Yes), the planning unit 231 generates a plan to carry out space creation processing by controlling the speed of the vehicle 10 in the second deceleration mode which allows the vehicle 10 to be decelerated at a greater change of speed than the first deceleration mode (step S106), and the series of processing steps is complete.

In the second deceleration mode, the vehicle 10 is decelerated as necessary to create, in the traveling lane ahead of the vehicle 10, a space allowing the other vehicle to move from the adjacent lane. Braking may also be carried out using the brake in the second deceleration mode. If braking is carried out using the brake, then it will be possible to reliably create a space while allowing the driver to recognize that the vehicle 10 is carrying out space creation processing.

When no other vehicle traveling in the adjacent lane has been detected by the detecting unit 232 in a region other than the visual field boundary zones of the sensors 2, 3 (step S105—No), the series of processing steps is complete. In this case, the space creation processing is not carried out since no other vehicle is traveling in an adjacent lane in the merging terrain.

Detection of a vehicle traveling in an adjacent lane by the detecting unit 232 in the visual field boundary zones of the sensors 2, 3 and in a region other than the boundary zones will now be described.

Figure 4A:
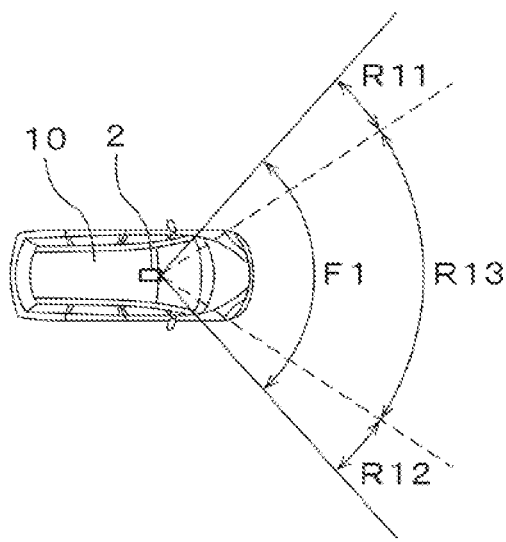
FIG. 4A is a plan view showing a visual field boundary zone in a camera image, for illustration of the visual field boundary zone.
Figure 4B:
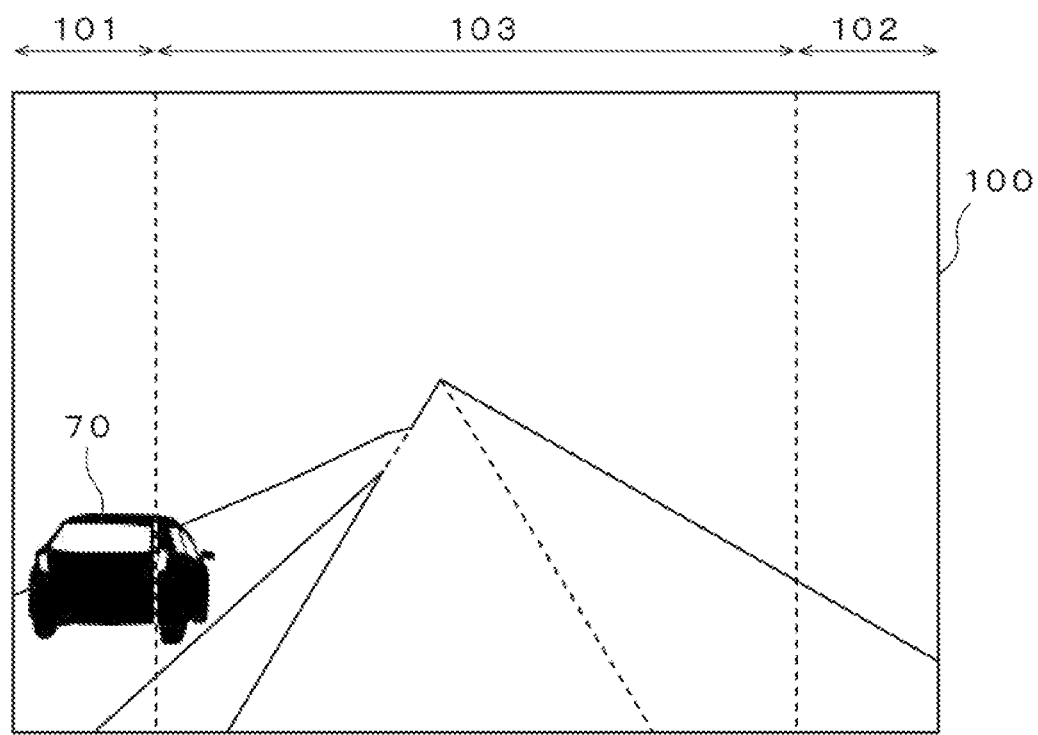
FIG. 4B is a diagram showing a visual field boundary zone in a camera image, for illustration of the boundary zone of the camera image.

The visual field boundary zone of the camera 2 will be explained first with reference to FIG. 4A and FIG. 4B. FIG. 4A and FIG. 4B are diagrams showing a visual field boundary zone in a camera image, where FIG. 4A is a plan view showing the boundary of the visual field and FIG. 4B is a diagram illustrating the boundary zone of the camera image.

The camera 2 has a visual field F1 directed in front of the vehicle 10. The visual field F1 includes a predetermined range to the left and right ahead of the vehicle 10. A predetermined region inside the visual field F1 from the boundary on the left side of the visual field F1 is the boundary zone R11, and a predetermined region inside the visual field F1 from the boundary on the right side of the visual field F1 is the boundary zone R12. The region R13 outside of the boundary zone is a region including the center of the visual field F1. The boundary zone R11 and boundary zone R12 may be set by azimuthal angle using the direction ahead of the vehicle 10 as the origin.

In the camera image 100, an environment included in the boundary zone R11 appears in the region 101 on the left side, and an environment included in the boundary zone R12 appears in the region 102 on the right side. In the center region 103 of the camera image 100 there appears an environment included in a region R13 other than the boundary zones. The regions 101, 102 and 103 in the camera image 100 can be set based on the mounted location and mounted orientation of the camera 2 in the vehicle 10, and the internal parameters of the camera.

The detecting unit 232 compares the reliability that a detected object output from the classifier is a vehicle against a predetermined reference reliability, and determines that a vehicle has been detected when the reliability of the object is above the reference reliability. The reference reliability will vary depending on the location of the detected object in the camera image. When at least part of the detected object is included within the boundary zone R11 or boundary zone R12, the detecting unit 232 uses a first reference reliability (for example, 0.5 to 0.7). When the detected object is included in a region other than the boundary zone R11 or boundary zone R12, the detecting unit 232 uses a second reference reliability that is higher than the first reference reliability. When a vehicle has been detected using the second reference reliability (such as 0.7 to 0.9), the vehicle detection accuracy is higher than when a vehicle is detected using the first reference reliability.

As mentioned above, the location detecting unit 232 also determines that another vehicle is traveling in a traffic lane defined by two mutually adjacent lane marking lines situated on either side of the center location of the other vehicle in the lateral direction. When a lane in which the other vehicle is traveling is adjacent to the traveling lane in which the vehicle 10 is traveling and vanishes by merging with the traveling lane, the detecting unit 232 determines that it is an adjacent lane.

In the example shown in FIG. 4B, the vehicle 70 detected in the region 101 on the left side is included in the boundary zone R11. The vehicle 70 is traveling on an adjacent lane. In other words, the vehicle 70 is detected traveling on the adjacent lane in the boundary zone R11. The detecting unit 232 determines that the vehicle 70 traveling in the adjacent lane has been detected in the boundary zone R11, since the object reliability is above the first reference reliability based on the camera image 100.

Figure 5:
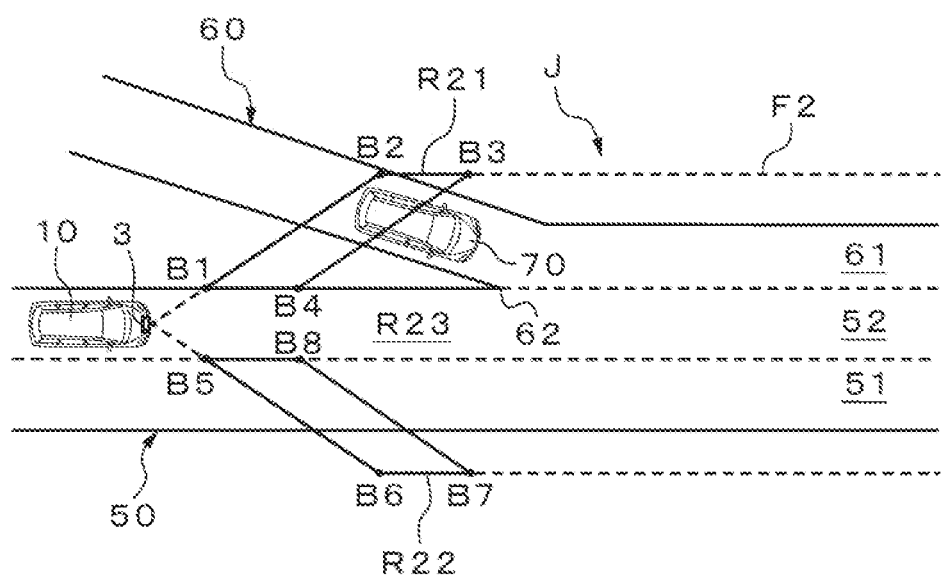
FIG. 5 is a diagram illustrating the visual field boundary zone in a distance image.

The visual field boundary zone of the LiDAR sensor 3 will now be explained with reference to FIG. 5. FIG. 5 is a diagram illustrating the visual field boundary zone in a distance image.

The LiDAR sensor 3 has a visual field F2 directed in front of the vehicle 10. A distance image within the visual field F2 is created by the detecting unit 232 based on reflected wave information. The distance image is created for a region within a predetermined range from the vehicle 10 in the left-right direction.

FIG. 5 shows an example of a distance image created when the vehicle 10 is at a location before the merging terrain J. A predetermined region inside the visual field F2 from the boundary on the left side of the distance image is the boundary zone R21, and a predetermined region inside the visual field F2 from the boundary on the right side of the visual field F2 is the boundary zone R22. The region R23 outside of the boundary zone is a region including the center of the visual field F2.

The boundary zone R21 is a rectangular region delineated by 4 points B1, B2, B3 and B4 when the visual field F2 is viewed flat. The boundary zone R22 is a rectangular region delineated by 4 points B5, B6, B7 and B8 when the visual field F2 is viewed flat.

The detecting unit 232 compares the reliability that a detected object output from the classifier is a vehicle against a predetermined reference reliability, and determines that a vehicle has been detected when the reliability of the object is above the reference reliability. The reference reliability will vary depending on the location of the detected object in the distance image. When at least part of the detected object is included within the boundary zone R21 or boundary zone R22, the detecting unit 232 uses a first reference reliability (for example, 0.5 to 0.7). When the detected object is included in a region other than the boundary zone R21 or boundary zone R22, the detecting unit 232 uses a second reference reliability that is higher than the first reference reliability. When a vehicle has been detected using the second reference reliability (such as 0.7 to 0.9), the detection accuracy is higher than when a vehicle is detected using the first reference reliability.

For example, when the rear end of another vehicle is included in the visual field boundary zone, the detecting unit 232, referring to reflected wave information for example, may potentially identify it as a moving object with a low speed relative to the vehicle 10. Thus, when at least part of the detected object is included in the boundary zone R21 or boundary zone R22, the detected object is more likely to be detected as a vehicle using the first reference reliability. Other objects may also be detected in a similar manner based on reflected wave information measured by a millimeter wave radar instead of the LiDAR sensor 3.

In the example shown in FIG. 5, the vehicle 70 is included in the boundary zone R21. The vehicle 70 is traveling in an adjacent lane. In other words, the vehicle 70 is detected traveling on the adjacent lane in the boundary zone R21. The detecting unit 232 determines that the vehicle 70 traveling in the adjacent lane has been detected in the boundary zone R21, since the object reliability is above the first reference reliability based on the distance image.

Space creation processing by the drive planning device 14 will be described with reference to FIG. 1.

As described above, after the determining unit 233 has determined that a merging terrain J exists and the vehicle 10 has reached the determination start location, it detects the vehicle 70 traveling in the lane 61 at time T1, in the boundary zones R11, R21, R21, R22 of the visual fields F1, F2 of the sensors 2, 3.

The determining unit 233 may also determine whether or not the vehicle 70 is traveling in the adjacent lane 61 in the boundary zones R11, R21, R21, R22 of the visual fields F1, F2 of the sensors 2, 3, based on the camera image and distance image. In this case, when it has been determined that the vehicle 70 is in the boundary zones R11, R21, R21, R22 of the visual fields F1, F2 of the sensors 2, 3 based on both the camera image and distance image, it is determined that the vehicle 70 has been detected traveling in the adjacent lane 61 in the boundary zones R11, R21, R21, R22 (step S103—Yes). The determining unit 233 may also determine whether or not the vehicle 70 is traveling in the adjacent lane 61 in the boundary zones R11, R21, R21, R22 of the visual fields F1, F2 of the sensors 2, 3, based only on either the camera image or distance image.

The planning unit 231 generates a plan to control the speed of the vehicle 10 in the first deceleration mode, until the vehicle 70 traveling in the lane 61 is detected in the region R13, R23 outside of the boundary zone of the visual field F1, F2. This processing is preprocessing for space creation processing.

The vehicle 70 can thus be detected rapidly by detecting the vehicle 70 at low precision in the boundary zone R11 of the visual field F1 or/and R21 of the visual field F2.

Due to deceleration of the vehicle 10 in the first deceleration mode, the vehicle 70 moves relatively ahead of the vehicle 10 and is detected in the region R13 outside of the boundary zone of the visual field F1 or/and R23 of the visual field F2. The drive planning device 14 can accurately acquire the location of the vehicle 70 by detecting the vehicle 70 at high precision in the region R13 outside of the boundary zone of the visual field F1 and the region R23 outside of the boundary zone of the visual field F2.

When the vehicle 70 traveling in the lane 61 has been detected in the region R13 outside of the boundary zone of the visual field F1 or/and R23 outside of the boundary zone of the visual field F2, the planning unit 231 generates a plan to carry out space creation processing by controlling the speed of the vehicle 10 in a second deceleration mode allowing the vehicle 10 to decelerate at a greater change of speed than the first deceleration mode. This allows the drive planning device 14 to ascertain the positional relationship between the vehicle 70 and vehicle 10 to generate a plan for stable space creation processing.

The vehicle control device 15 carries out space creation processing based on the driving plan which includes space creation processing. Space creation processing is then carried out. It is thus possible to prevent the vehicle 70 traveling in the adjacent lane 61 from forcibly moving into the traveling lane 51, thus avoiding creation of a dangerous situation.

At time T1, when it has been determined that a merging terrain J exists and the vehicle 70 traveling in the lane 61 has been detected in the region R13 outside of the boundary zone of the visual field F1 or/and R23 outside of the boundary zone of the visual field F2, the drive planning device 14 generates a plan to carry out space creation processing by controlling the speed of the vehicle 10 in a second deceleration mode.

In the manner described above, the drive planning device can generate a plan for stable space creation processing after accurate detection of another vehicle, both in cases where the other vehicle traveling in an adjacent lane has been detected in a boundary zone that includes the boundary of a predetermined visual field and in cases where the other vehicle traveling in the adjacent lane has been detected in a zone other than the visual field boundary zone.

Specifically, when another vehicle traveling in the adjacent lane has been detected in the boundary zone that includes the boundary of the predetermined visual field, the drive planning device creates a plan for preprocessing prior to space creation processing, so that the other vehicle is detected in a zone other than the visual field boundary zone. The drive planning device also generates a plan for space creation processing after having detected the other vehicle traveling in the adjacent lane in the zone other than the visual field boundary zone.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

The invention claimed is:

1. A vehicle control device comprising a processor configured to detect an other vehicle based on surrounding environment information representing an environment surrounding an own vehicle within a predetermined visual field, wherein the other vehicle is detected in a first detection mode in a boundary zone that includes a boundary of the visual field, and the other vehicle is detected in a second detection mode that detects the other vehicle with higher precision than the first detection mode in a zone other than the visual field boundary zone,
   determine whether or not a merging terrain exists where an adjacent lane which is adjacent to a traveling lane in which the own vehicle is traveling vanishes by merging with the traveling lane within a predetermined range from a current location of the own vehicle ahead on a course of the own vehicle, and
   generate a plan to control the speed of the own vehicle for space creation processing whereby a space is created on the traveling lane ahead of the own vehicle to allow movement of the other vehicle from the adjacent lane into the traveling lane,
   wherein,
   when it has been determined that the merging terrain exists and the other vehicle traveling in the adjacent lane has been detected in the visual field boundary zone, a plan is generated to control the speed of the own vehicle in a first deceleration mode until the other vehicle traveling in the adjacent lane is detected in a zone other than the visual field boundary zone, or
   when it has been determined that the merging terrain exists and the other vehicle traveling in the adjacent lane has been detected in a zone other than the visual field boundary zone, a plan is generated to carry out space creation processing by controlling the speed of the own vehicle at a second deceleration mode which allows deceleration at a greater change of speed than the first deceleration mode.

2. The vehicle control device according to claim 1, wherein the processor is further configured to generate a plan to carry out the space creation processing by controlling the speed of the own vehicle at the second deceleration mode, when the other vehicle has been detected in a zone other than the visual field boundary zone after the speed of the own vehicle has been controlled in the first deceleration mode.

3. The vehicle control device according to claim 1, wherein the processor is further configured to generate a plan to decelerate the own vehicle without braking in the first deceleration mode, and to decelerate the own vehicle with braking in the second deceleration mode.

4. A computer-readable, non-transitory storage medium storing a computer program for vehicle control, which causes a processor to execute a process and the process comprising:
- detecting an other vehicle based on surrounding environment information representing an environment surrounding an own vehicle within a predetermined visual field, wherein the other vehicle is detected in a first detection mode in a boundary zone that includes a boundary of the visual field, and the other vehicle is detected in a second detection mode that detects the other vehicle with higher precision than the first detection mode in a zone other than the visual field boundary zone;
- determining whether or not a merging terrain exists where an adjacent lane which is adjacent to a traveling lane in which the own vehicle is traveling vanishes by merging with the traveling lane within a predetermined range from a current location of the own vehicle ahead on a course of the own vehicle; and
- generating a plan to control the speed of the own vehicle for space creation processing whereby a space is created on the traveling lane ahead of the own vehicle to allow movement of the other vehicle from the adjacent lane into the traveling lane, wherein,
- when it has been determined that the merging terrain exists and the other vehicle traveling in the adjacent lane has been detected in the visual field boundary zone, it is planned to control the speed of the own vehicle in a first deceleration mode until the other vehicle traveling in the adjacent lane is detected in a zone other than the visual field boundary zone, or
- when it has been determined that the merging terrain exists and the other vehicle traveling in the adjacent lane has been detected in a zone other than the visual field boundary zone, it is planned to carry out space creation processing by controlling the speed of the own vehicle at a second deceleration mode which allows deceleration of the own vehicle at a greater change of speed than the first deceleration mode.

5. A method for controlling a vehicle carried out by a vehicle control device and the method comprising:
- detecting an other vehicle based on surrounding environment information representing an environment surrounding an own vehicle within a predetermined visual field, wherein the other vehicle is detected in a first detection mode in a boundary zone that includes a boundary of the visual field, and the other vehicle is detected in a second detection mode that detects the other vehicle with higher precision than the first detection mode in a zone other than the visual field boundary zone;
- determining whether or not a merging terrain exists where an adjacent lane which is adjacent to a traveling lane in which the own vehicle is traveling vanishes by merging with the traveling lane within a predetermined range from a current location of the own vehicle ahead on a course of the own vehicle; and
- generating a plan to control the speed of the own vehicle for space creation processing whereby a space is created on the traveling lane ahead of the own vehicle to allow movement of the other vehicle from the adjacent lane into the traveling lane, wherein,
- when it has been determined that the merging terrain exists and the other vehicle traveling in the adjacent lane has been detected in the visual field boundary zone, it is planned to control the speed of the own vehicle in a first deceleration mode until the other vehicle traveling in the adjacent lane is detected in a zone other than the visual field boundary zone, or
- when it has been determined that the merging terrain exists and the other vehicle traveling in the adjacent lane has been detected in a zone other than the visual field boundary zone, it is planned to carry out space creation processing by controlling the speed of the own vehicle at a second deceleration mode which allows deceleration of the own vehicle at a greater change of speed than the first deceleration mode.

* * * * *